(12) United States Patent
Kumarasamy et al.

(10) Patent No.: US 7,756,116 B2
(45) Date of Patent: Jul. 13, 2010

(54) SUPPLEMENTARY SERVICES USING SECURE MEDIA

(75) Inventors: Parameswaran Kumarasamy, San Jose, CA (US); Soumya Kalahasti, Fremont, CA (US); Prasad Miriyala, Union City, CA (US); Sandeep Singh Kohli, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 928 days.

(21) Appl. No.: 11/545,224

(22) Filed: Oct. 10, 2006

(65) Prior Publication Data

US 2008/0146192 A1 Jun. 19, 2008

(51) Int. Cl.
*H04L 12/66* (2006.01)
(52) U.S. Cl. ............. 370/352; 370/310; 370/310.2; 370/322; 370/328; 370/329; 455/416; 455/417; 455/422.1; 455/426.2; 455/464; 455/466; 379/211.01; 379/211.02; 379/212.01; 379/215.01
(58) Field of Classification Search ............. 370/310, 370/310.2, 322, 328, 329, 352–356; 455/416, 455/417, 422.1, 426.2, 463, 464, 466; 379/211.01, 379/211.02, 212.01, 215.01
See application file for complete search history.

(56) References Cited

U.S. PATENT DOCUMENTS

| 5,081,679 | A | * | 1/1992 | Dent ..................... 380/272 |
| 6,047,072 | A | * | 4/2000 | Field et al. .............. 380/283 |
| 6,064,878 | A | * | 5/2000 | Denker et al. ............ 455/415 |
| 6,889,321 | B1 | * | 5/2005 | Kung et al. .............. 713/153 |
| 6,996,716 | B1 | * | 2/2006 | Hsu ...................... 713/175 |
| 7,085,376 | B2 | * | 8/2006 | DiSanto et al. ........... 380/28 |
| 7,200,747 | B2 | * | 4/2007 | Riedel et al. ............. 713/165 |
| 7,321,971 | B2 | * | 1/2008 | Wilding et al. ........... 713/169 |
| 7,434,047 | B2 | * | 10/2008 | Sharma .................. 713/163 |
| 2003/0081790 | A1 | * | 5/2003 | Kallahalla et al. ........ 380/281 |
| 2005/0176431 | A1 | * | 8/2005 | Herrero Veron .......... 455/436 |
| 2006/0010321 | A1 | * | 1/2006 | Nakamura et al. ........ 713/168 |
| 2006/0095766 | A1 | * | 5/2006 | Zhu et al. ............... 713/168 |

OTHER PUBLICATIONS

H. Schulzrinne, "Session Initiation Protocol (SIP)-H.323 Interworking Requirements", Jul. 2005, 15 pages, http://www.itef.org/rfc/rfc4123.txt.
M. Baugher, et al., "The Secure Real-time Transport Protocol (SRTP)", Mar. 2004, 40 pages, http://www.itef.org/rfc/rfc3711.txt.
Hemant Agrawal, et al. "SIP-H.323 Interworking" Internet Engineering Task Force, Jul. 13, 2001, 47 pages, http://old.iptel.org/info/players/ietf/internetworking/h323/draft-agrawal-sip-h323-interworking-01.txt.

\* cited by examiner

*Primary Examiner*—Stephen M D'Agosta
(74) *Attorney, Agent, or Firm*—Trellis IP Law Group, PC (57) ABSTRACT

In one particular embodiment, the secure media includes information sent using secure real-time transfer protocol (sRTP). Supplementary services may include call transfers, forwards/redirects, call hold with music on hold (MOH), call hold with no MoH, call resume, call park, call pickup, call blast etc. In a call flow, a call request may be received from a first device for a second device. The call request may include at least one set of keys and be ready for establishment of an sRTP call. It is then determined that a supplementary service is needed for the call request. For example, a supplementary service may indicate that a call redirect to a third device is required. The gateway then facilitates a supplementary service call with the third device. This is facilitated without contacting the first device to generate a second key after receiving the initial call request.

18 Claims, 9 Drawing Sheets

SUPPLEMENTARY SERVICES USING SECURE MEDIA

TECHNICAL FIELD

The present disclosure relates generally to voice over Internet Protocol (VoIP).

BACKGROUND

Secure real-time transport protocol (sRTP) defines a profile of RTP intended for secure communication of RTP data. Interworking between protocols, such as H.323 and session initiation protocol (SIP) is provided for basic connections. However, when supplementary services, such as call transfers and forwards, are needed, inefficiencies result when using sRTP. For example, a first device may send a call request for a second device. The call request includes a first key and is forwarded with the first key to the second device. If a supplementary service is required, such as transferring the call a third device, then the first key cannot be used to send a call request to the third device. This is because the second device already knows the first key and thus it would not be secure to send it to the third device. Accordingly, the first device is contacted again for it to generate a third key. Thus, the first device sends another message with a second key. The call request is then forwarded to the third device with the second key.

The above process is inefficient in that it requires additional messaging with the first device to have it generate the second key. This uses valuable bandwidth. Also, additional delays are introduced in a call because the first device needs to be contacted again and a response needs to be received from the first device, in order to forward the call request to third device.

SUMMARY

In one particular embodiment, a method for providing supplementary services for secure media is provided. The method comprises receiving, from a first device, a call request for a second device using a secure protocol. The call request includes a first key. A supplementary service that is needed for the call request is determined. A supplementary service call is facilitated with the third device using a number of messages required to perform the supplementary service without using the secure protocol. Accordingly, extra messaging is not required to perform the supplementary service.

A further understanding of the nature and the advantages of particular embodiments disclosed herein may be realized by reference of the remaining portions of the specification and the attached drawings.

DESCRIPTION OF EXAMPLE EMBODIMENTS

Particular embodiments generally relate to providing supplementary services for secure media. In one particular embodiment, the secure media includes information sent using secure real-time transport protocol (sRTP). Supplementary services may include call transfers, call forwards/redirects, call hold with music on hold (MoH), call hold with no MoH, call resume, call park, call pickup, call blast, etc. In a call flow, a call request may be received from a first device for a second device. The call request may include at least a first key and be ready for establishment of an sRTP call. It is then determined that a supplementary service is needed for the call request. For example, a supplementary service may indicate that a call redirect to a third device is required. Supplementary services may also include rotary scenarios where a call may be redirected to another destination as specified by a dial-peer, if the originally intended end device does not answer the call. The gateway then facilitates a supplementary service call with the third device. This is facilitated without contacting the first device to generate a second key after receiving the initial call request. the facilitation may be the connecting of the call between the first device and the second device. This connection may be the signaling necessary to connect the call whether or not the third device picks up the call or not. Thus, extra messaging to contact the first device to generate the second key after it is determined that a supplementary service is required from what would be originally needed in call establishment procedures is not needed.

The supplementary service call may be facilitated in different ways. For example, the first device may send a second key in the initial call request. When the supplementary service is determined, the second key may be used to initiate a call request for the third device.

In a second example, the gateway may generate the second key for use in sending the call request to the third device. The second key may then be sent back to the first device after the call request is confirmed from the third device such that the first device can participate in secure communications with the third device.

In a third example, a slow start is used in that the first key is not sent to the second device initially. When a supplementary service is needed, then the first key may be used to send the call request to the third device. Thus, the first key is not compromised by sending it to the first device.

Figure 1:
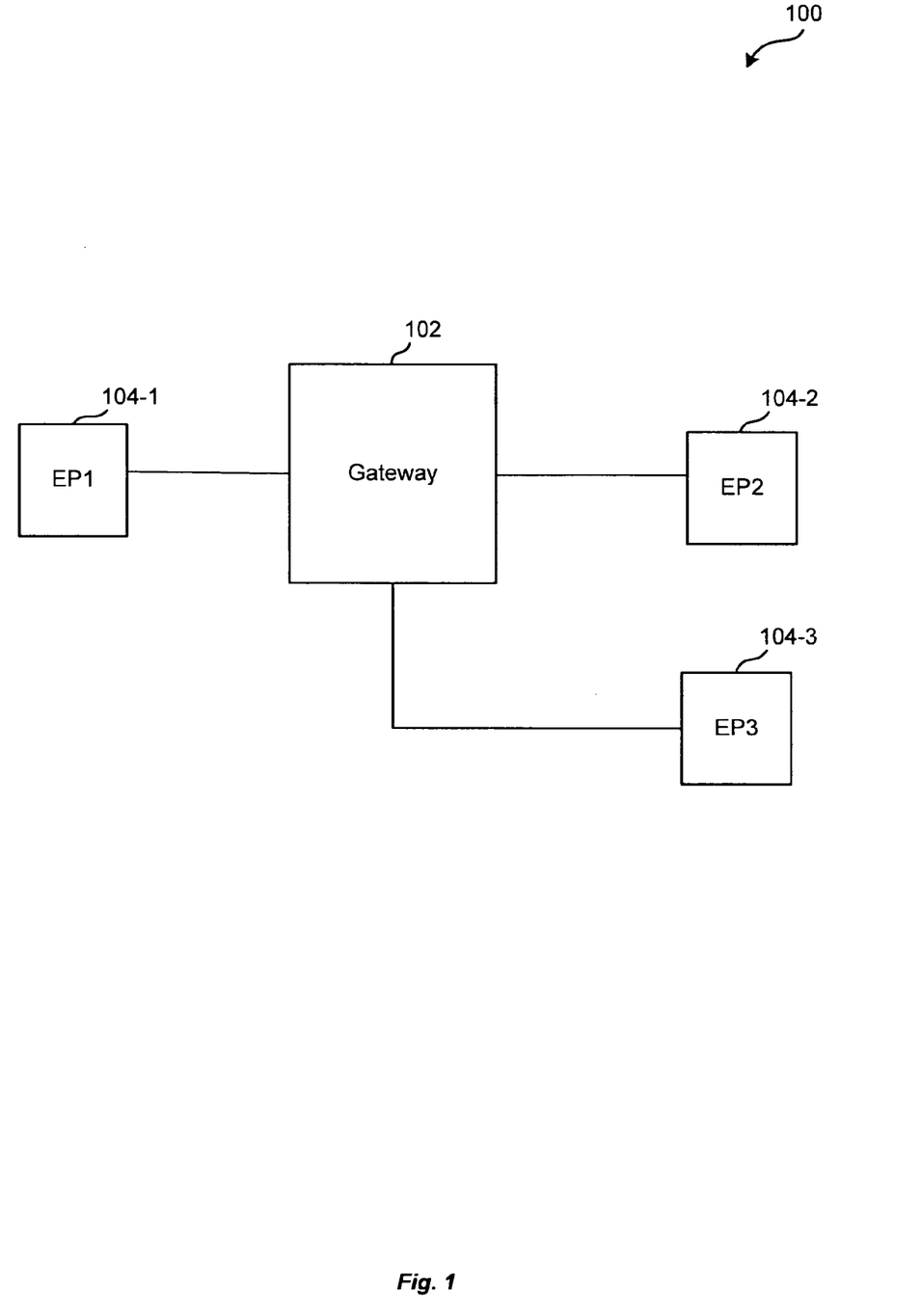
FIG. 1 depicts an example system for providing supplementary services.

FIG. 1 depicts an example system 100 for providing supplementary services. As shown, a gateway 102 and end devices 104 (EP1, EP2, and EP3) are provided.

End devices 104 may be any devices that can participate in a communication. For example, end devices 104 may include VoIP telephones, computers, cell phones, soft phones, personal digital assistants, or any other devices that can participate in a communication.

End devices 104 may communicate using either the H.323 protocol or SIP. Although H.323 and SIP are described, it will be recognized that other protocols may be appreciated. For example, successor protocols or enhancements to H.323 and/or SIP may be used by particular embodiments.

Gateway 102 may be any network device configured to manage communications with end devices 104. In one particular embodiment, gateway 102 includes session border controllers, SIP proxies, IP-PBXs, media gateways, soft switches, back-to-back user agents (B2BUAs), IP-to-IP gateways, etc. Gateway 102 sits in-between end devices 104 and may interconnect various networks that use different protocols and services. In one particular embodiment, end device 104-1, end device 104-2, and end device 104-3 may be in different networks. They may be interconnected via gateway 102.

Gateway 102 is configured to provide interworking between different protocols. In one example, end device 104-1 may communicate using a first protocol and end device 104-2 and/or end device 104-3 may communicate using a second protocol. Gateway 102 provides interworking between different protocols such that end device 104-1 may communicate with end device 104-2 and/or end device 104-3.

Gateway 102 may provide interworking for supplementary services associated with secure media. Secure media may be any media that is sent using a secure service. The secure service may require the use of keys or other secure information, such as certificates, tokens, etc. Although a key is described, it will be understood that a key can be any information used in providing a secure call. Also, it will be understood that a key may also be a hash of a key, master key, salt key, private key, public key, or any other form of a key.

In one particular embodiment, sRTP may be used. sRTP provides encryption, message authentication integrity, and replay protection to RTP data. All the provided features of sRTP may be optional and may be separately enabled or disabled. Other secure protocols may be used, such as sRTCP, etc.

A supplementary service may be a service that is needed in addition to an initial call request. Examples of supplementary services include call transfers, call forwards/redirects, call hold with music on hold (MoH), call hold with no MoH, call resume, call park, call pick up, call blast, etc.

Gateway 102 may provide interworking between different protocols. For example, gateway 102 may interwork H.323 into SIP messages and vice versa. Also, it will be noted that gateway 102 may also facilitate H.323-to-H.323 calls and SIP-to-SIP calls, or facilitate any other calls within the same protocol. Particular embodiments will discuss interworking between H.323 to SIP; however, it will be understood that other protocols may be appreciated.

As described above, different methods for providing supplementary service calls may be used. The supplementary service calls are provided without any extra signaling than that would be required if the secure protocol was not used. For example, fast start or slow start procedures on H323 and early offer or delayed offer on SIP may be used to establish a call. If a supplementary service is required, additional signaling to determine another secure key is not needed than if a supplementary service that was not secure was used. For example, end device 104-1 does not need to be contacted to generate another key after the first call request is sent.

In one particular embodiment, end device 104-1 may initiate a call request to end device 104-2. End device 104-2 may indicate that a call transfer or forward is required. In this case, a supplementary service is needed. Gateway 102 provides the supplementary service without contacting end device 104-1 to generate another key after the initial call request is received. Thus, messaging is saved in that gateway 102 does not need to exchange messages with end device 104-1 to generate another key before it can send a call request to end device 104-3.

Figure 2:
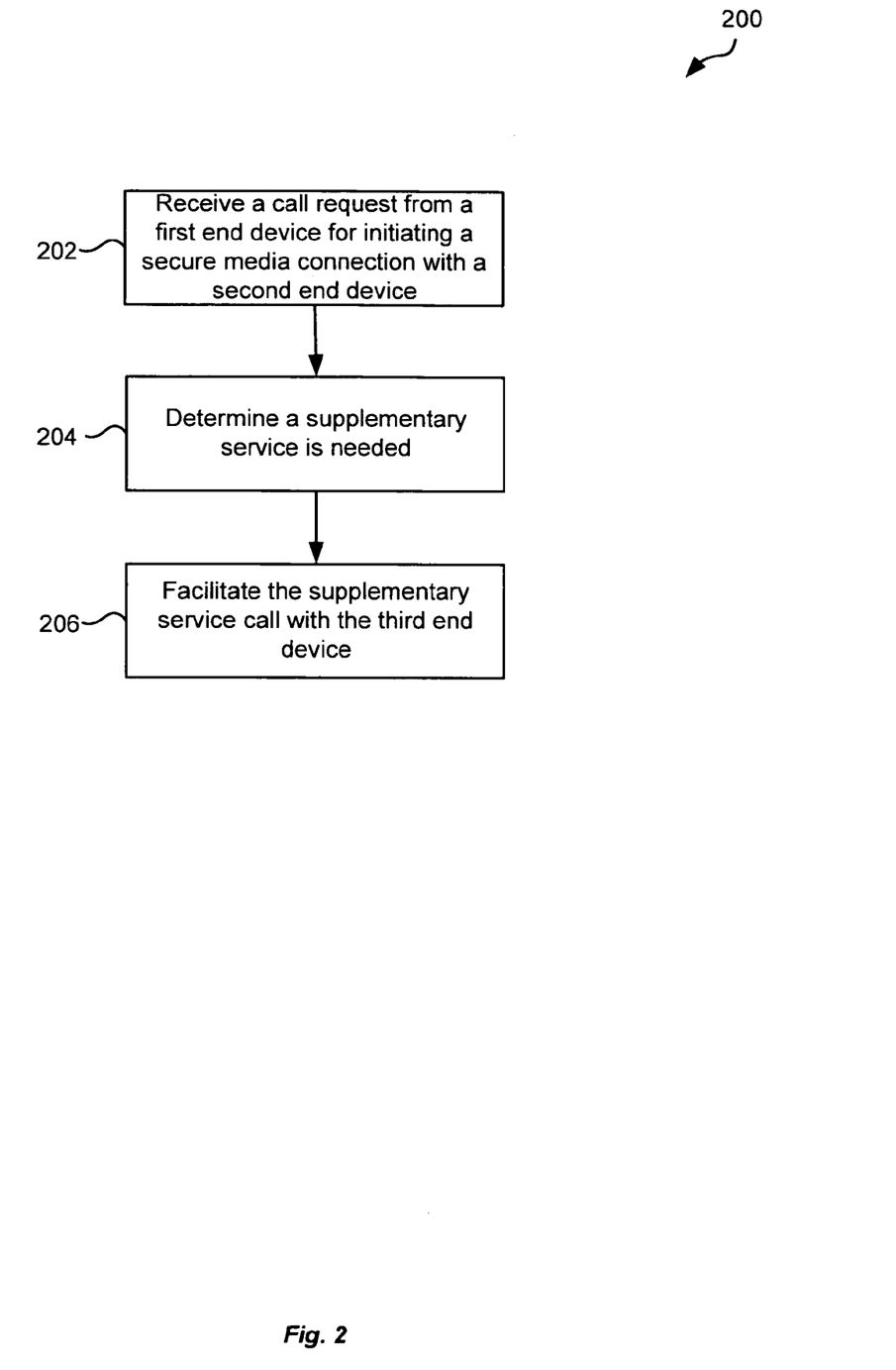
FIG. 2 depicts an example of a method for providing supplementary services for secure media.

FIG. 2 depicts an example of a method for providing supplementary services for secure media. In step 202, gateway 102 receives a call request for initiating a secure media connection (e.g., an sRTP connection). For example, the call request may be a set-up request that includes at least a first key.

In step 204, gateway 102 determines that a supplementary service call is needed. For example, it may be determined that a call transfer or call forward from end device 104-2 to end device 104-3 is needed.

In step 206, gateway 102 facilitates the supplementary service call with a third device. This is done without contacting end device 104-1 to perform the supplemental service. The supplementary service calls are provided without any extra signaling than that would be required if the secure protocol was not used. For example, end device 104-1 is not contacted to generate and send another key after it sent the call request received in step 202. As mentioned above, gateway 104 may facilitate the supplementary service call with end device 104-3 using different methods. The following will describe three particular embodiments that may be used; however, it will be understood that other particular embodiments may be appreciated.

Figure 3:
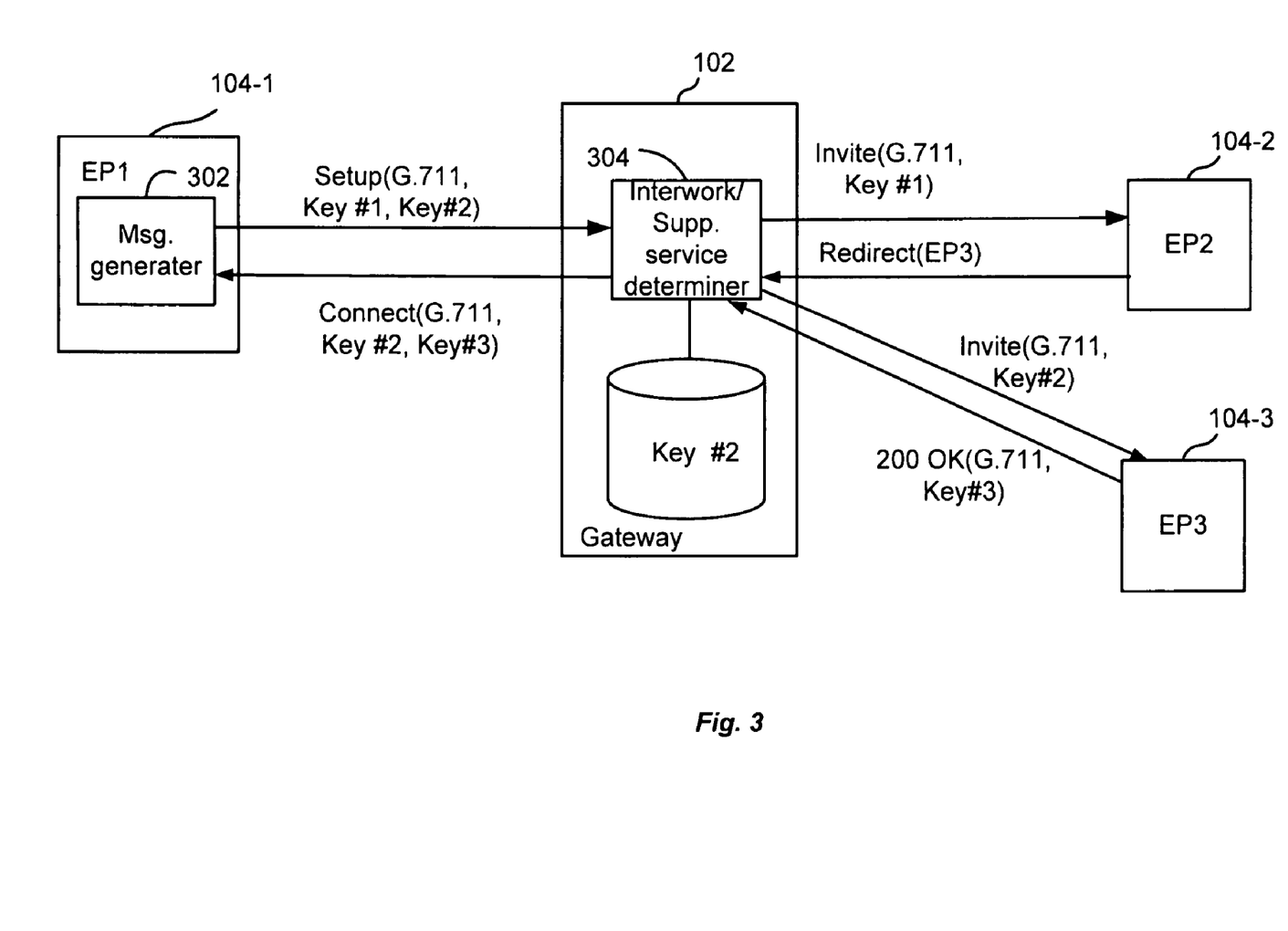
FIG. 3 depicts an example of a method for providing supplementary services.

FIG. 3 depicts an example of a method for providing supplementary services. Although the following examples are shown for H.323 to SIP supplementary services with sRTP, it will be understood that particular embodiments may be used for other call flows using sRTP, or any other secure media protocol. For example, SIP-SIP, H.323-H.323 with ECS and H.450 support may be provided.

As shown, end device 104-1 includes a message generator 302. Message generator 302 generates a message that includes two or more keys. For example, the message may be a Setup (G.711, key #1, key #2) message. G.711 is the encoding to be used for the media, but it will be understood that other encodings may be used. Key #1 is a first secure key and key #2 is a second secure key. It should be noted that a person skilled in the art will appreciate different variations for using key #1 and key #2. For example, more than two keys may be sent.

An interworking/interworking/supplementary service determiner 304 receives the call Setup message. Interworking/supplementary service determiner 304 sends a call request to end device 104-2. For example, interworking/supplementary service determiner 304 may interwork a Setup message (in H.323) into an Invite (G.711, key #1) message (in SIP). In this case, key #2 is not sent to end device 104-2.

End device 104-2 then sends a response back to gateway 102. In one particular embodiment, the response indicates that a supplementary service is required. For example, the response may indicate that the call should be redirected to end device 104-3. In one particular embodiment, a 302 redirect message is sent.

Interworking/supplementary service determiner 304 then facilitates the supplementary service call with end device 104-3. As shown, a second call request using key #2, an Invite (G.711, key #2) message, is sent to end device 104-3. This is performed without contacting end device 104-1 for it to generate a second key after it sent the initial call request.

End device 104-3 then can send a response, such as a 200 OK (G.711, key #3) message. This response includes a third key that is generated as is known in the art. The third key may be used for decryption and authentication by end device 104-1 and the second key may be used for decryption and authentication by end device 104-3.

Interworking/supplementary service determiner 304 then sends a connect message, such as a Connect (G.711, key #2, key #3) message to end device 104-1. This provides end device 104-1 with the information needed to establish a secure call with end device 104-3. Gateway 102 may obtain additional keys from end devices 104 to facilitate any further supplementary services, if needed.

Figure 4:
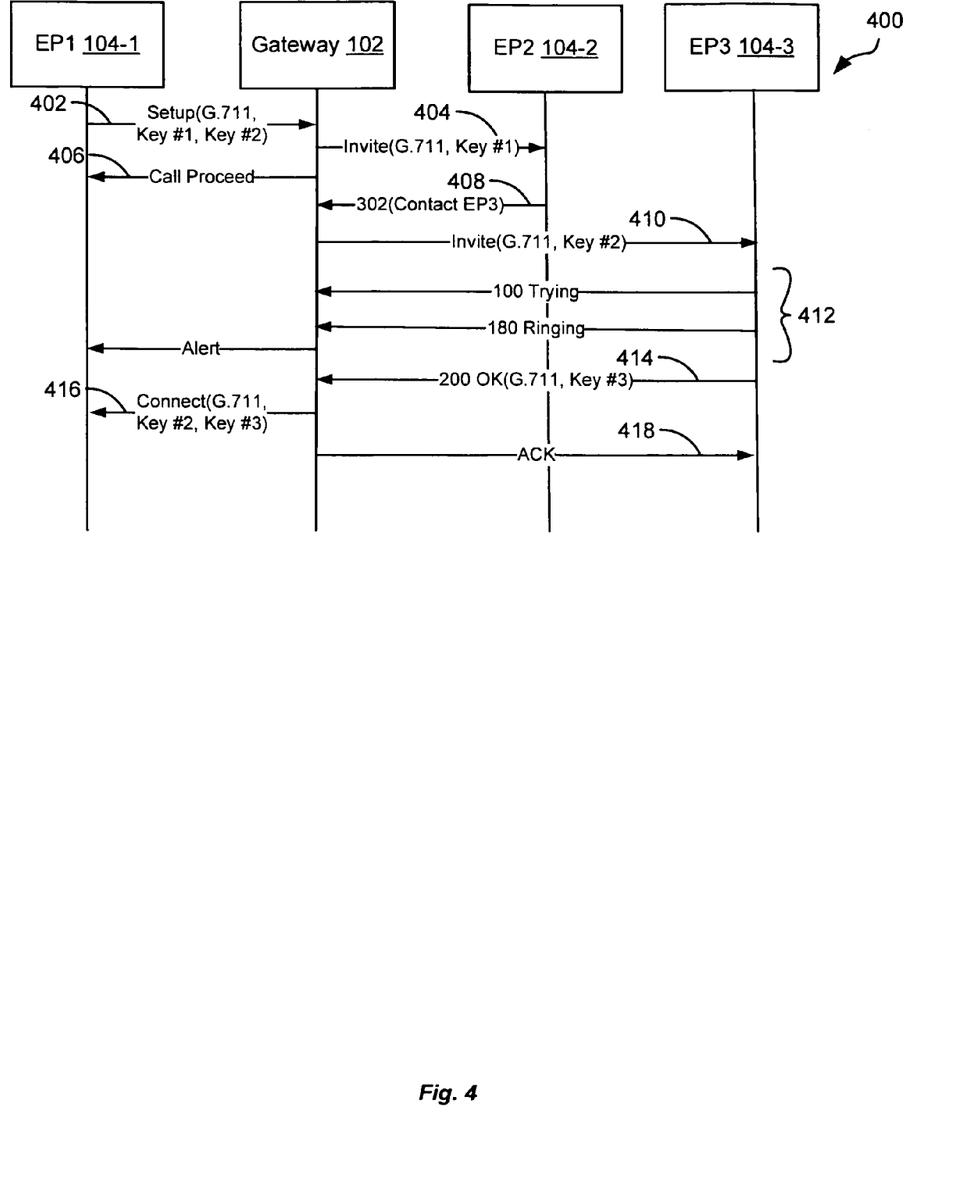
FIG. 4 depicts an example call flow for the example in FIG. 3.

FIG. 4 depicts an example call flow for the example in FIG. 3. As shown, messaging between end device 104-1 (EP1), gateway 102, end device 104-2 (EP2), and end device 104-3 (EP3) is provided. End device 104-1 communicates using H.323, and end devices 104-2 and 104-3 communicate using SIP.

At 402, a Setup (G.711, key #1, key #2) message is sent from end device 104-1 to gateway 102. Gateway 102 then sends an Invite (G.711G.711, key #1) message to end device 104-2. Gateway 102 stores key #2 and does not send it with the Invite message. Also, at 406, gateway 102 sends a CallProc message back to end device 104-1, indicating that the call setup request is proceeding.

At 408, end device 104-2 sends a 302 (contact EP3) message. This message indicates that a redirect to end device 104-3 is requested by end device 104-2.

When gateway 102 receives the call redirect, it determines that a supplementary service interwork is needed. Thus, key #2 is retrieved and, at 410, an Invite (G.711, key #2) message is sent to initiate a redirect to end device 104-3.

At 412, messaging between end device 104-1, gateway 102, and end device 104-3 is performed to set up a secure call. At 414, end device 104-3 sends a 200 OK (G.711, key #3) message. This message includes a third key, key #3, which is needed to provide the secure call.

At 416, gateway 102 sends a Connect (G.711, key #2, key #3) message to end device 104-1. Accordingly, end device 104-1 now has the necessary keys to participate in a secure media call with end device 104-3. For example, key #2 may be used for decryption and authentication by end device 104-3 and key #3 may be used for decryption and authentication by end device 104-1. At 418, an ACK is sent. Secure media can then flow between end device 104-1 and end device 104-3 using key #2 and key #3.

Accordingly, in call flow 400, a call is established using fast-start procedure on the H.323 side and early offer procedure on SIP side. Thus, a quick media path is established and maintains a secure media path. End device 104-2 cannot access the conversation between end device 104-1 and end device 104-3 because key #1 is different from key #2 and key #3, which are being used in the call. Accordingly, the call is secure. Note that SRTP keys may be exchanged over signaling path and hence the signaling path has to be protected using any existing security methods such as IP Sec, TLS etc. Otherwise keys may be visible, thus enabling keys availability to unintended users, resulting in a media security lapse. It should be noted that additional keys may be included in the first offer that may support any number of supplementary service invocations. In one particular embodiment, once the call is established using fast start procedures, any further media re-negotiation may be performed using H.245 slow start procedures. It is expected that gateway 102 always will have an additional key that can be used for any further supplementary service attempts.

Figure 5:
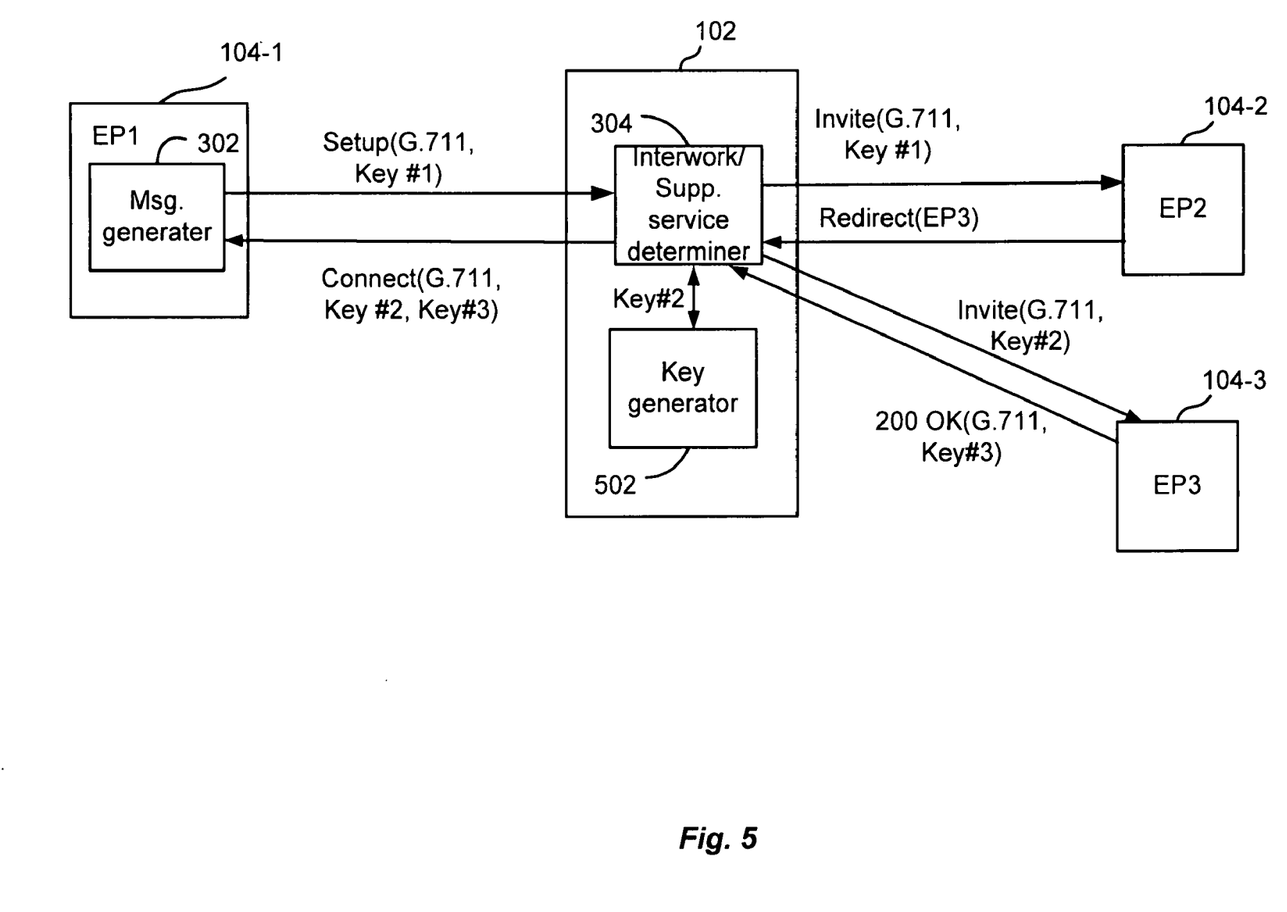
FIG. 5 depicts a second example for providing supplementary services.

FIG. 5 depicts a second example for providing supplementary services. As shown, message generator 302 generates a call request using a key #1. In this particular embodiment, a key #2 is not included in the call request.

Interworking/supplementary service determiner 304 receives the call request and forwards it to end device 104-2. The call request may be interworked to a different protocol. A response is received that indicates that the call should be redirected to end device 104-3.

Interworking/supplementary service determiner 304 then determines that a supplementary service is needed and a second key is required. Accordingly, a key generator 502 is contacted and it is configured to generate a second key, key #2. Key generator 502 may generate key #2 using any methods known in the art Interworking/supplementary service determiner 304 is then configured to send a call request to end device 104-3 using key #2. End device 104-3 then sends a response with a key #3 back to gateway 102.

Interworking/supplementary service determiner 304 sends a Connect message that includes key #2 and key #3 to end device 104-1. Accordingly, end device 104-1 may use key #2 and key #3 to set up a secure call with end device 104-3.

Figure 6:
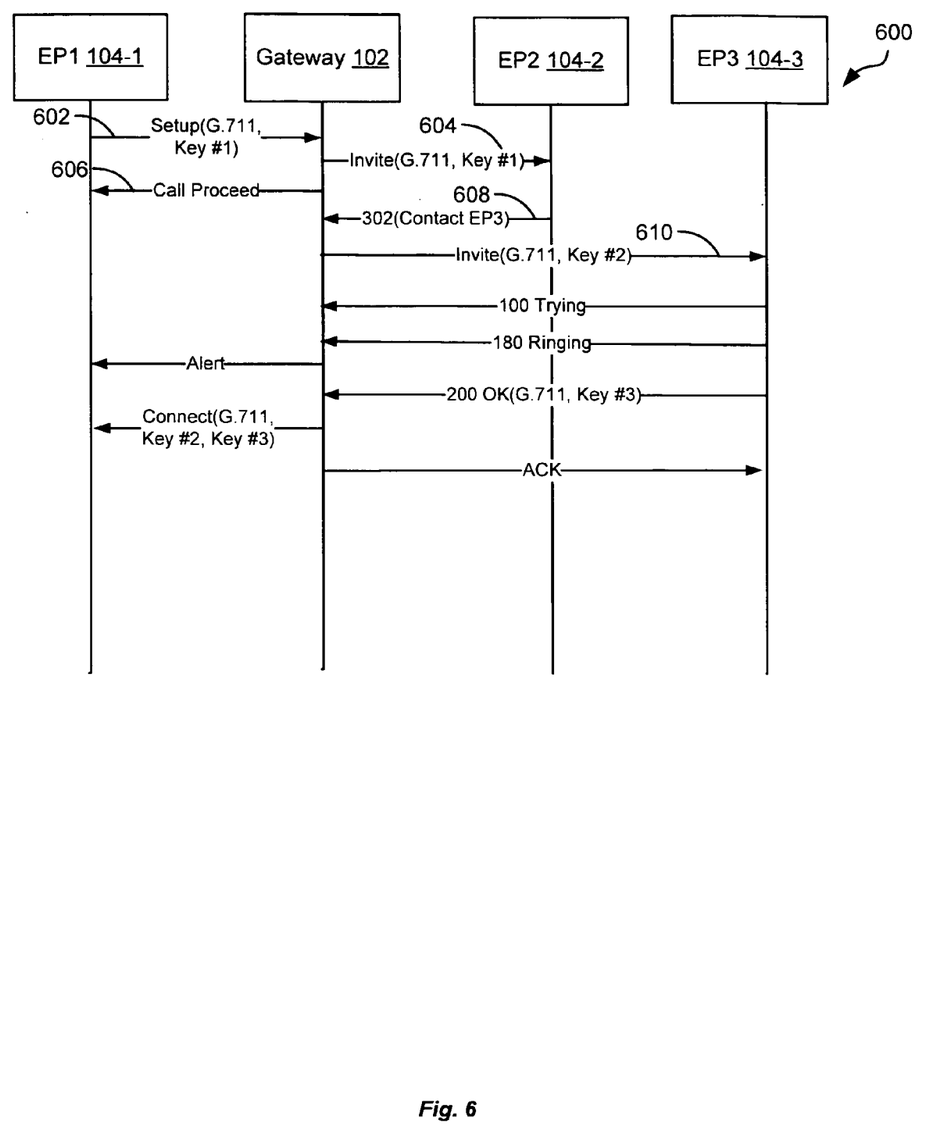
FIG. 6 depicts an example call flow for the example in FIG. 5.

FIG. 6 depicts an example call flow for the example in FIG. 5. At 602, end device 104-1 sends a Setup (G.711, key #1) message to gateway 102. At 604, gateway 102 sends an Invite (G.711, key #1) message to end device 104-2. At 606, gateway 102 sends a CallProc message back to end device 104-1. At 608, end device 104-2 sends a 302 (Contact EP3) message to gateway 102. This indicates a redirect to end device 104-3.

At 610, gateway 102 then generates key #2 and sends an Invite (G.711, key #2) message to end device 104-2. In this case, gateway 102 generates key #2 instead of having end device 104-1 send the key #2 in the initial call request. Also, end device 104-1 does not need to generate a new key after sending the initial request.

The process then proceeds as described above in FIG. 4 in call flows 412, 414, 416, and 418. A secure media path is then set up.

Figure 7:
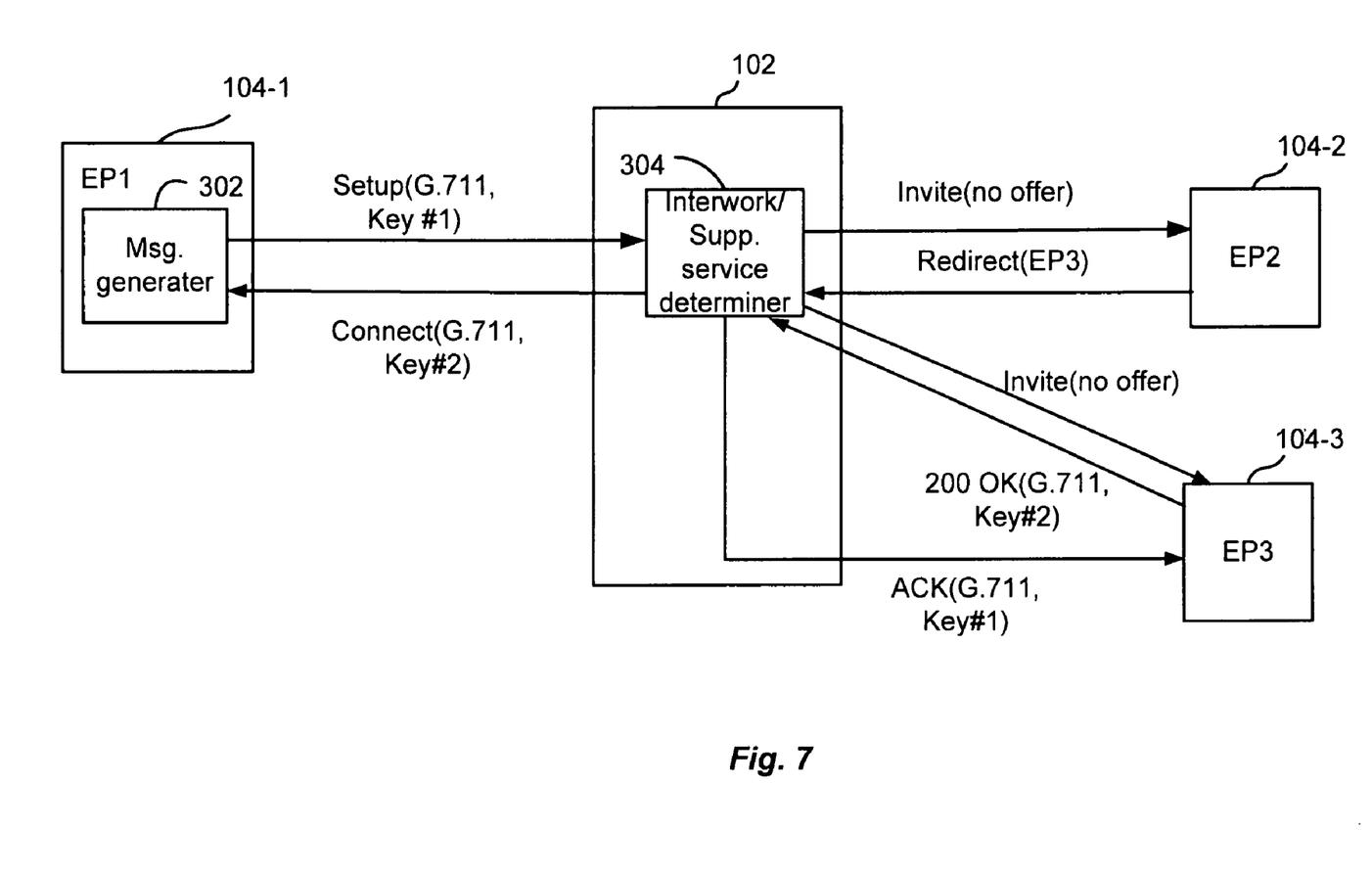
FIG. 7 depicts a third example for providing supplementary services.

FIG. 7 depicts a third example for providing supplementary services. Message generator 302 and end device 104-1 send a call request with a key #1 to gateway 102.

In this case, a delayed offer is used to establish the call. This means that that key #1 is not used until the media path is established. In the call flow, interworking/supplementary service determiner 304 then sends an Invite to end device 104-2 that does not include key #1. For example, the Invite may be an Invite message with no offer. Thus, key #1 is not included in this Invite. This delays the establishment of a secure media path.

End device 104-2 then sends a redirect message for end device 104-3. Interworking/supplementary service determiner 304 determines that a supplementary service is needed. Accordingly, interworking/supplementary service determiner 304 sends a call request to end device 104-3. Because key #1 was not included in the initial call request to end device 104-2, it can be sent to end device 104-3 without compromising security when the call connects.

End device 104-3 then sends a response with a key #2. Interworking/supplementary service determiner 304 sends a Connect message with key #2 to end device 104-1. Interworking/supplementary service determiner 304 does not need to send key #1 back to end device 104-1 because key #1 was used in sending the call request to end device 104-3 (although it can in some particular embodiments). Thus, a call is set up between end device 104-1 and end device 104-3 using key #1 and key #2. Accordingly, a delayed offer is used such that the initial key is not used until the call is connected or secure media path is required. This eliminates the unnecessary generation of extra keys.

Figure 8:
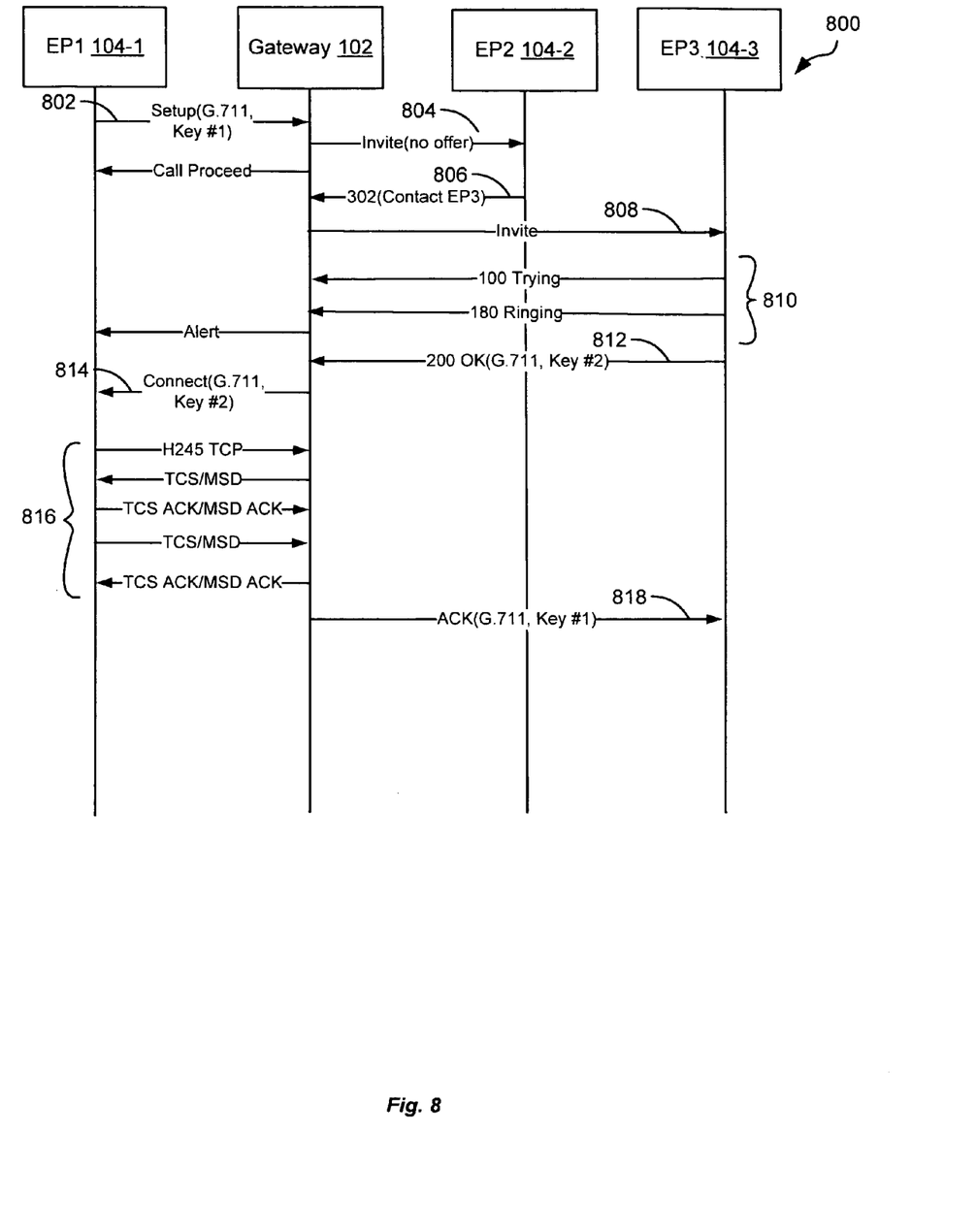
FIG. 8 depicts an example call flow for the example in FIG. 7.

FIG. 8 depicts an example call flow for the example in FIG. 7. In call flow 800, a fast start is used on the H.323 side and a delayed offer is used on the SIP side. At 802, a Setup (G.711, key #1) message is sent from end device 104-1 to gateway 102.

At 804, gateway 102 then sends a delayed offer message to end device 104-2. For example, an Invite with no offer is sent to end device 104-2. This does not include key #1.

At 806, end device 104-2 sends a redirect message, such as a 302 (Contact EP3) message. This indicates that a redirect to end device to 104-3 is requested. Gateway 102 then determines that a supplementary service is needed.

At 808, an Invite message with no offer is sent to end device 104-3. At 810, messaging occurs to set up the call.

At 812, end device 104-3 sends a 200 OK (G.711, key #2) message to gateway 102. This message includes a key #2 that is generated by end device 104-3. At 814, gateway 102 interworks the message into a Connect (G.711, key #2) message. This sends key #2 to end device 104-1 so key #2 can be used to set up the secure call. At 816, messaging between end device 104-1 and gateway 102 occurs to set up the call.

At 818, gateway 102 sends the key #1 to end device 104-3 to allow a secure media path to be established using the keys. For example, an ACK (G.711, key #1) message is sent to end device 104-3. Accordingly, gateway 102 holds key #1 until it is determined that a call is connected. If it is not needed (no redirection is requested and the call should be set up with end device 104-2), the delayed offer allows gateway 102 to send key #1 to end device 104-2 at a later time.

Figure 9:
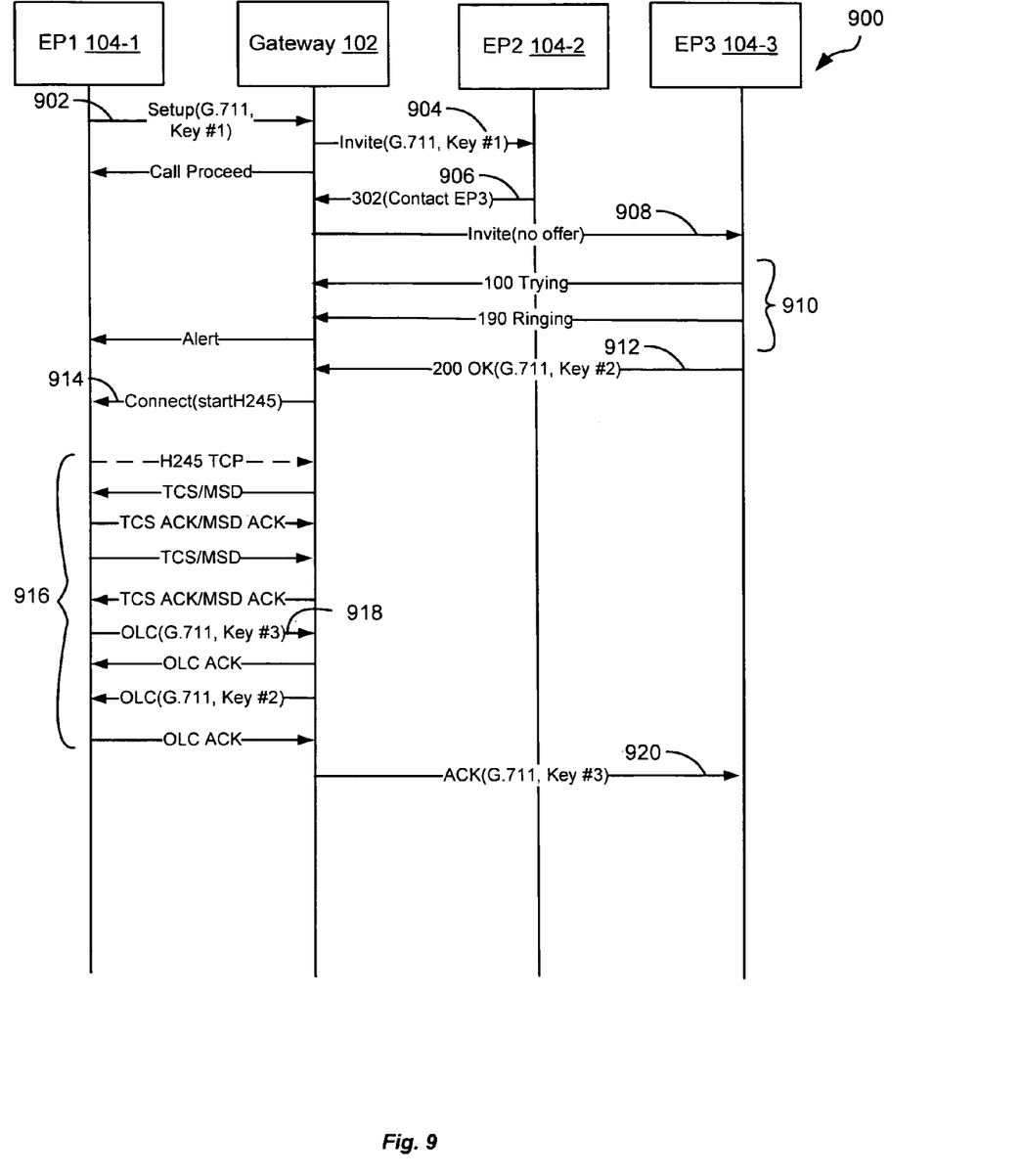
FIG. 9 depicts another example call flow for the example in FIG. 7.

In another particular embodiment, a fall back to slow start may be used to provide the secure media path with supplementary services. But, in this case, the initial Invite includes an offer as gateway 102 received fast start proposal with key #1. FIG. 9 depicts another example call flow for the example in FIG. 7.

At 902, a Set-up (G.711, key #1) message is sent from end device 104-1 to gateway 102. Gateway 102 sends an Invite with offer, such as Invite (G.711, key #1) message to end device 104-2. In this case, a fast start and early offer are used. At 906, a 302 (Contact EP3) message is sent to gateway 102. This indicates that a redirect is requested and gateway 102 determines that supplementary services are needed.

At 908, a slow start is then started because a new key needs to be used for a call with end device 104-3. This is because key #1 was first sent in a message to end device 104-2. Accordingly, an Invite (no offer) is sent to end device 104-3. At 910, messaging is provided between end device 104-3, gateway 102, and end device 104-1 to set up a call.

At 912, end device 104-3 sends a 200 OK (G.711, key #2) message to gateway 102. In this case, end device 104-3 generates a key #2. Gateway 102 then interworks the message into a Connect (StartH245) at 914, indicating fallback request to slow start.

At 916, messaging occurs between end device 104-1 and gateway 102 to exchange terminal capabilities and setup the media. At 918, end device 104-1 generates a key #3 and sends it to gateway 102. Although end device 104-1 is contacted to generate key #3, the supplementary service call is provided without any extra signaling than that would be required if the secure protocol was not used. For example, using the slow start and delayed offer, end device 104-1 would have been contacted again even if the secure protocol is being used.

At 920, gateway 102 sends an ACK (G.711, key #3) message to end device 104-3. In this case, key #3 is sent to end device 104-3. Accordingly, key #2 and key #3 may be used to establish a secure media path. End device 104-2 was only sent key #1 and thus cannot use it to access the secure media path established between end device 104-1 and end device 104-3.

Particular embodiments provide many advantages. For example, supplementary service calls may be provided using a fast start and early offer procedures. This helps establish a secure media path quickly. There is minimal delay in establishing the supplementary service call, and also, the supplementary service calls are provided without any extra signaling than that would be required if the secure protocol is not being used. For example, no additional messages are needed with end device 104-1 for it to generate additional keys. Also, a slow start may be used where extra messages to end device 104-1 requesting it to generate additional keys are not needed. Here the existing OLCs are used for SRTP key exchanges along with media address and port information.

Particular embodiments provide a simple and efficient method to achieve H.323-SIP secure media handling. There is no increase in post-dial delay as additional information is piggy-backed with existing messages. Thus, no new messages are needed.

Also, it will be noted that gateway 102 may use a flow around where media flows directly between endpoints and not via gateway 102 or flow through where media between endpoints flow through gateway 102.

Although the invention has been described with respect to specific particular embodiments thereof, these particular embodiments are merely illustrative, and not restrictive of the invention. Also note that any combinations of these particular embodiments can be used to achieve multiple supplementary service invocations. Also, different type of call flows including SIP-SIP, H323-H323 may be used and particular embodiments are not limited to H323-SIP.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that an particular embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory.

Particular embodiments can be implemented in the form of control logic in software or hardware or a combination of both. The control logic may be stored in an information storage medium, such as a computer-readable medium, as a plurality of instructions adapted to direct an information processing device to perform a set of steps disclosed in particular embodiments. Based on the disclosure and teachings provided herein, a person of ordinary skill in the art will appreciate other ways and/or methods to implement the present invention.

A "processor" or "process" includes any, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a particular embodiment" means that a particular feature, structure, or characteristic described in connection with the particular embodiment is included in at least one particular embodiment and not necessarily in all particular embodiments. Thus, respective appearances of the phrases "in one embodiment", "in an embodiment", or "in a particular embodiment" in various places throughout this specification are not necessarily referring to the same particular embodiment. Furthermore, the particular features, structures, or characteristics of any specific particular embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments of the invention will be employed without a corresponding use of other features without departing from the scope and spirit of the invention as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method performed by a gateway apparatus, the method comprising:
    receiving, from a first device, a call request for a second device using a secure protocol, the call request including a first key;
    determining that a supplementary service to a third device is needed for the call request; and
    causing a supplementary service call to be connected between the first device and the third device using a number of messages that are required to perform the supplementary service without using the secure protocol, wherein the causing the supplementary service call to be connected comprises sending a slow start message to the second device, the slow start message not including the first key, the supplementary service call to the third device being facilitated by sending a supplementary call request to the third device using the first key.

2. The method of claim 1, wherein the call request includes the second key, wherein the second key is used to connect the supplementary service call.

3. The method of claim 2, further comprising storing the second key until it is determined that the supplementary service is needed.

4. The method of claim 1, further comprising:
    receiving a third key from the third device in response to a call request for the supplementary service; and
    sending the third key to the first device.

5. The method of claim 1, wherein causing the supplementary service call to be connected between the first device and the third device comprises:
    generating a second key; and
    sending a second call request to the third device with the second key to facilitate the supplementary service call with the third device.

6. The method of claim 1, wherein the supplementary service comprises a redirect.

7. The method of claim 1, wherein connecting the supplementary service call between the first device and the third device is performed without contacting the first device to generate and send a second key after receiving the call request.

8. The method of claim 1, further comprising interworking the call request received from the first device from a first transmission protocol to a call request in a second transmission protocol.

9. An apparatus, comprising:
a receiver configured to receive, from a first device, a call request for a second device using a secure protocol, the call request including a first key; and
a supplementary servicer determiner configured to:
determine that a supplementary service to a third device is needed for the call request; and
cause a supplementary service call to be connected between the first device and the third device using a number of messages that are required to perform the supplementary service without using the secure protocol, wherein the supplementary servicer determiner is configured to send a slow start message to the second device, the slow start message not including the first key, and to send a supplementary call request to the third device using the first key.

10. The apparatus of claim 9, wherein the call request includes the second key, wherein the supplementary servicer determiner is configured to use the second key to facilitate the supplementary service call.

11. The apparatus of claim 10, wherein the supplementary servicer determiner is configured to store the second key until it is determined that the supplementary service is needed.

12. The apparatus of claim 9, wherein the supplementary servicer determiner is configured to:
receive a third key from the third device in response to a call request for the supplementary service; and
send the third key to the first device.

13. The apparatus of claim 9, wherein the supplementary servicer determiner is configured to:
generate a second key; and
send a second call request to the third device with the second key to facilitate the supplementary service call with the third device.

14. The apparatus of claim 9, wherein the supplementary service comprises a redirect.

15. The apparatus of claim 9, wherein the supplementary servicer determiner is configured to cause the supplementary service call to be connected between the first device and the third device without contacting the first device to generate and send a second key after receiving the call request.

16. The apparatus of claim 9, wherein the supplementary servicer determiner is configured to interwork the call request received from the first device from a first transmission protocol to a call request in a second transmission protocol.

17. An apparatus, comprising:
means for receiving, from a first device, a call request for a second device using a secure protocol, the call request including a first key;
means for determining that a supplementary service to a third device is needed for the call request; and
means for causing a supplementary service call to be connected between the first device and the third device using a number of messages that are required to perform the supplementary service without using the secure protocol, wherein the causing the supplementary service call to be connected comprises sending a slow start message to the second device, the slow start message not including the first key, the supplementary service call to the third device being facilitated by sending a supplementary call request to the third device using the first key.

18. The apparatus of claim 17, further comprising means for interworking the call request received from the first device from a first transmission protocol to a call request in a second transmission protocol.

* * * * *